United States Patent
Sukeno et al.

(10) Patent No.: US 6,816,156 B2
(45) Date of Patent: Nov. 9, 2004

(54) IMAGING DEVICE

(75) Inventors: Junji Sukeno, Tokyo (JP); Takashi Nakao, Hyogo (JP); Kazuhiro Sugiyama, Tokyo (JP); Junko Kijima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 457 days.

(21) Appl. No.: 10/103,703

(22) Filed: Mar. 25, 2002

(65) Prior Publication Data

US 2003/0016214 A1 Jan. 23, 2003

(30) Foreign Application Priority Data

Jul. 19, 2000 (JP) .................................... P 2001-219161

(51) Int. Cl.$^7$ ................................................ G09G 5/00
(52) U.S. Cl. ...................................... 345/207; 345/204
(58) Field of Search ............................... 345/204, 205, 345/206, 207, 690, 691, 698, 212, 214, 215; 348/264; 358/535

(56) References Cited

U.S. PATENT DOCUMENTS 4,926,251 A * 5/1990 Sekizawa et al. ........... 358/535
5,541,653 A * 7/1996 Peters et al. ................ 348/264

FOREIGN PATENT DOCUMENTS

JP          2001-28760         1/2001

* cited by examiner

Primary Examiner—Vijay Shankar
(74) Attorney, Agent, or Firm—Birch, Stewart, Kolasch & Birch, LLP

(57) ABSTRACT

The imaging device according to the present invention adjusts the luminance in the first image such that the addition value of the value, which is obtained by multiplying the feature quantity of the luminance in the central portion of the first image by the first coefficient, and the feature quantity of the luminance in the peripheral portion of the first image becomes the first target value, and also adjusts the luminance in the second image such that the addition value of the value, which is obtained by multiplying the feature quantity of the luminance in the central portion of the second image by the second coefficient that is set independently of the first coefficient, and the feature quantity of the luminance in the peripheral portion of the second image becomes the second target value.

13 Claims, 14 Drawing Sheets

FIG. 8A
FIG. 8B
FIG. 8C
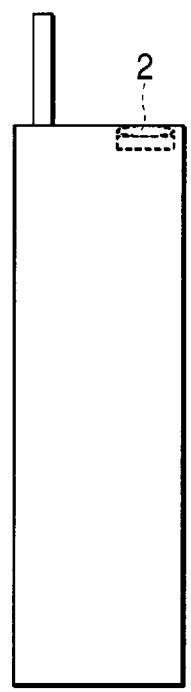
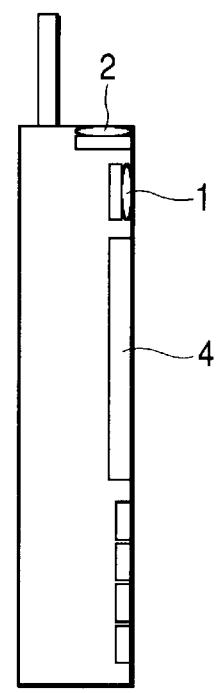
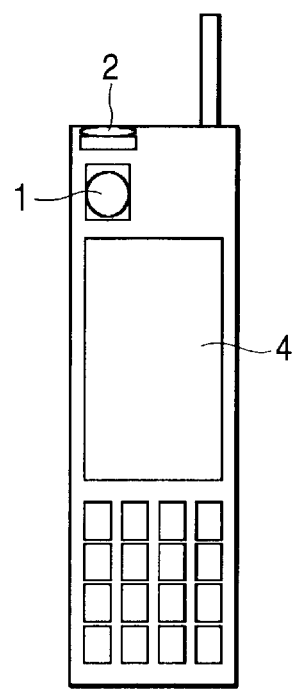
FIG. 9
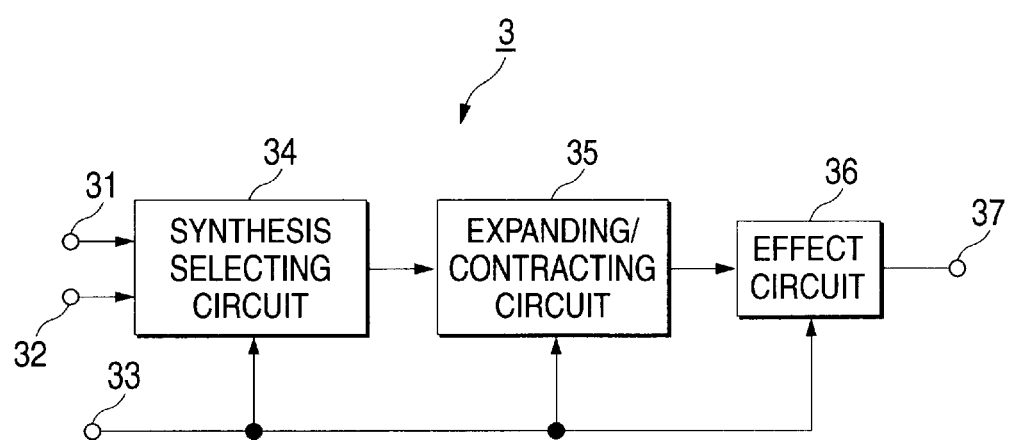

FIG. 13A  FIG. 13B  FIG. 13C
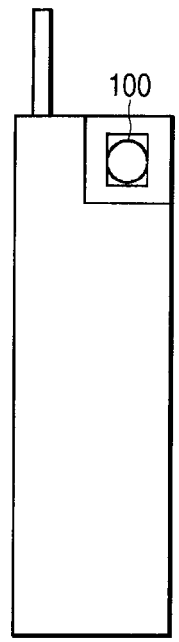
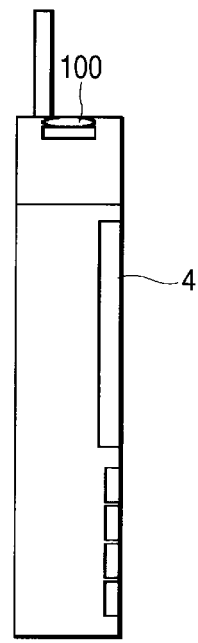
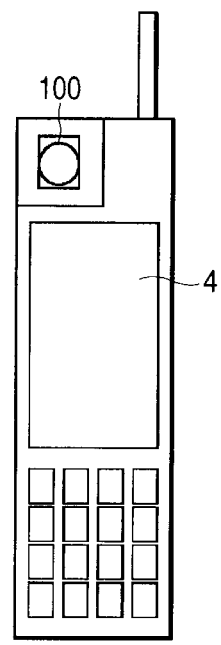
FIG. 14
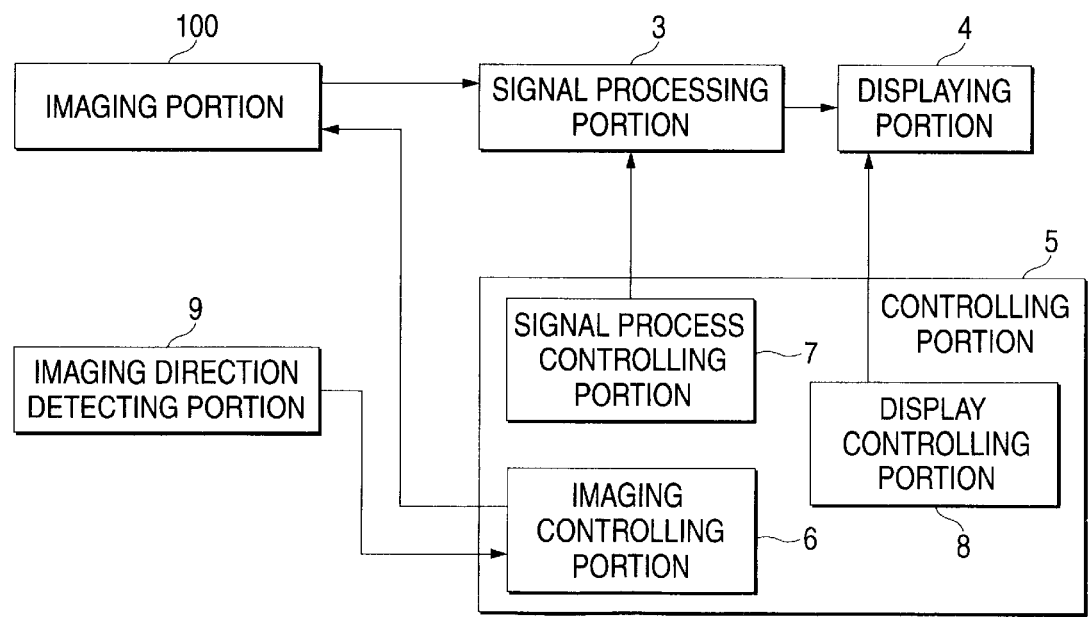

FIG. 21A
FIG. 21B
FIG. 21C
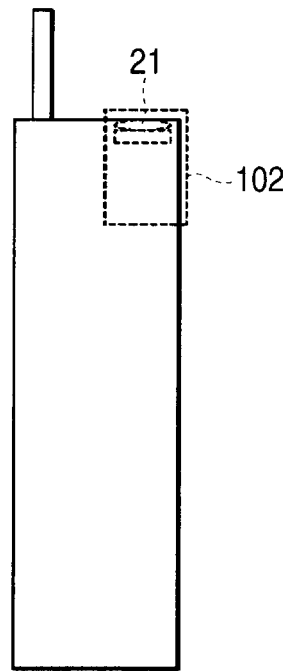
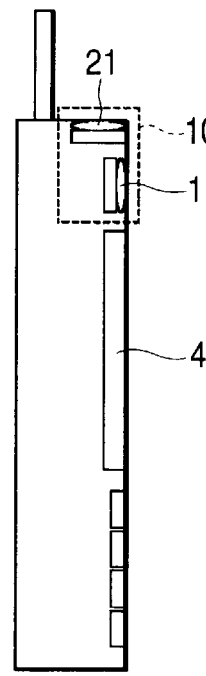
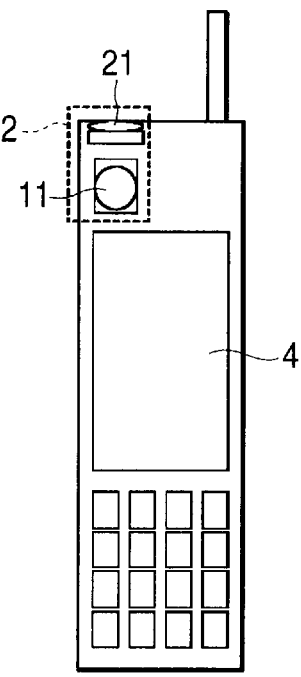
FIG. 22A
FIG. 22B
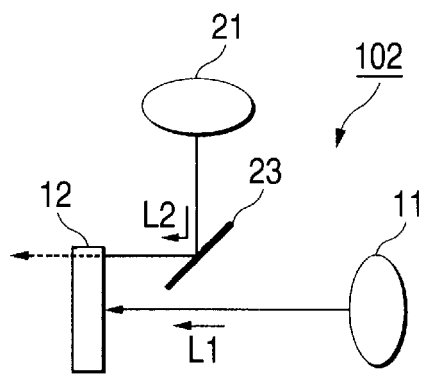
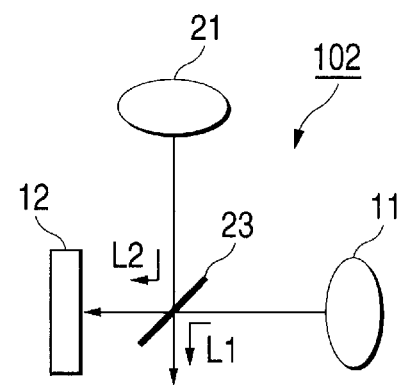

*FIG. 25*
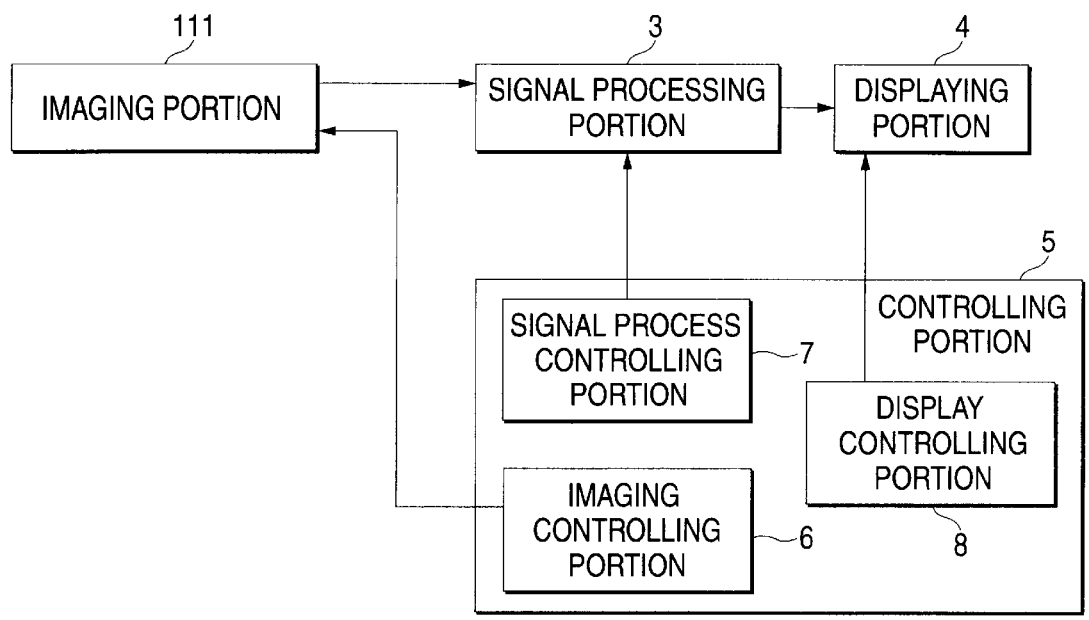
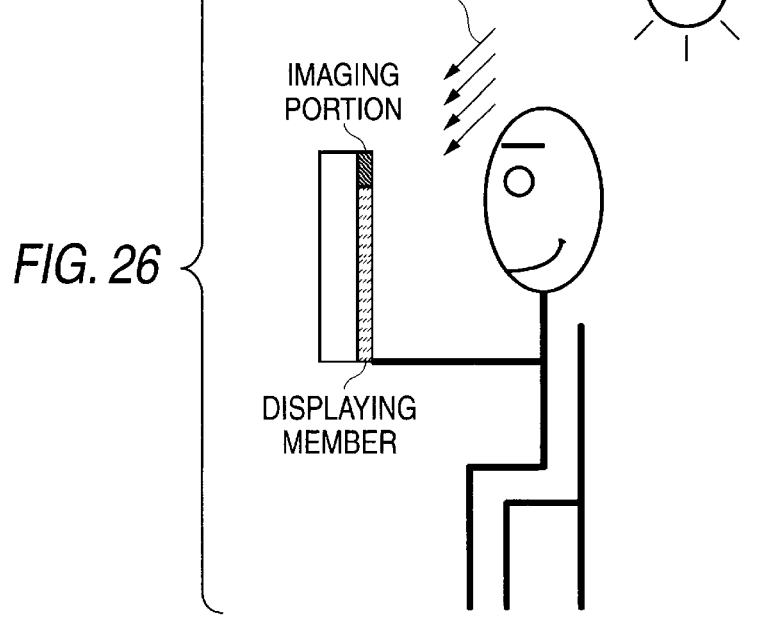
*FIG. 26*

IMAGING DEVICE

BACKGROUND OF THE INVENTION

The present invention relates to an imaging device provided in a mobile information terminal, etc.

In recent years, the mobile information terminal into which a small size camera is installed is observed with interest. The image that is picked up by the user can be transmitted to a third person by a mobile information terminal with a camera.

FIG. 25 is a block diagram showing a configuration of the normal imaging device employed in the mobile information terminal. In FIG. 25, the image that is picked up by an imaging portion 111 is signal-processed by a signal processing portion 3 and is displayed on a displaying portion 4. Operations of the imaging portion 111, the signal processing portion 3, and the displaying portion 4 are controlled by an imaging controlling portion 6, a signal process controlling portion 7, and a display controlling portion 8 in a controlling portion 5. More particularly, the imaging controlling portion 6 controls the exposure correction and the white balance correction of the imaging portion 111, the signal process controlling portion 7 controls the image processing such as the expansion/contraction of the image, and the display controlling portion 8 executes display/non-display of the picked-up image, the display position control, etc. In this manner, the good picked-up image can be obtained by executing the automatic exposure and the auto white balance control.

In the imaging device provided to the mobile information terminal, etc., the case where the scene that is in front of the cameraman (opposing image) is picked up and the case where the cameraman himself (own image) is picked up can be considered. Since the opposing image and the own image have different objects and are exactly opposite in the imaging direction, different imaging controls must be applied to the opposing image and the own image to get the good image.

For example, as shown in FIG. 26, if it is tried to pick up the opposing image under the circumstance where the opposing image is positioned in the front-light state and then pick up the own image under the same circumstance, the image of the cameraman is picked up in the backlight state and thus the good own image cannot be picked up. Also, in many liquid crystal panels used as the display member of the mobile information terminal, in order to improve the outdoor visibility, normally the reflecting plate for reflecting the incident light (in this case, the solar light) is provided as the underlying layer of the liquid crystal panel and then the liquid crystal panel surface is irradiated from the back by the light reflected by the reflecting plate. As a result, as shown in FIG. 26, if the image is picked up in the situation that the light is irradiated onto the display screen, the own image is picked up in the backlight state.

SUMMARY OF THE INVENTION

The present invention is made to overcome the above subject, and it is an object of the present invention to provide an imaging device which is capable of obtaining good opposite and own images in the mobile information terminal having an imaging function, etc. without the influence of imaging circumstances.

An imaging device according to the present invention comprises a member for picking up a first image and a second image; a member for calculating a feature quantity of a luminance in a central portion and a peripheral portion of the first image, and adjusting the luminance in the first image such that an addition value of a value that is obtained by multiplying the feature quantity of the luminance in the central portion of the first image by a first coefficient and the feature quantity of the luminance in the peripheral portion of the first image becomes a first target value; and a member for calculating the feature quantity of the luminance in the central portion and the peripheral portion of the second image, and adjusting the luminance in the second image such that an addition value of a value that is obtained by multiplying the feature quantity of the luminance in the central portion of the second image by a second coefficient, which is set independently of the first coefficient, and the feature quantity of the luminance in the peripheral portion of the second image becomes a second target value.

The second coefficient is set larger than the first coefficient.

Also, the second target value is set larger than the first target value.

Also, an area of the central portion of the first image is set larger than an area of the central portion of the second image.

Also, weighting rates of luminance component integrated values in respective central portions of the first image and the second image are set to about 4:7.

Also, an area of the central portion in the second image is set to about ¼ of an overall area of the second image.

Also, an imaging device further comprises a member for converting a tone of the luminance in the second image.

Also, an imaging state of the second image is detected, and the tone assigned to a low luminance component that is lower than a predetermined value is increased if the second image is positioned in a backlight state.

Also, an imaging device further comprises a member for synthesizing the first image and the second image.

Also, the first image and the second image are picked up by an imaging member that is rotatably supported to a main body.

Also, an imaging device further comprises a first lens member for forming an image corresponding to the first image; a second lens member for forming an image corresponding to the second image; and a member for selecting one of images formed by the first lens member and the second lens member, and forming a selected image onto an imaging surface of an imaging member.

BRIEF DESCRIPTION OF THE DRAWINGS

FIGS. 8A to 8C are views showing another external configuration of the imaging device according to the embodiment 1.

FIG. 9 is a view showing an internal configuration of a signal processing portion.

FIGS. 13A to 13C are views showing an external configuration of an imaging device according to an embodiment 2.

FIG. 14 is a view showing an internal configuration of the imaging device according to the embodiment 2.

FIGS. 21A to 21C are views showing another external configuration of the imaging device according to the embodiment 5.

FIGS. 22A and 22B are views showing a detailed configuration of an imaging portion.

FIG. 25 is a view showing an internal configuration of the imaging device in the prior art.

FIG. 26 is a descriptive view illustrating the problem in the imaging device in the prior art.

DETAILED DESCRIPTION OF THE PREFERRED EMBODIMENTS

The present invention will be explained in more detail with reference to the drawings showing embodiments hereinafter.

(Embodiment 1)

Figure 1A:
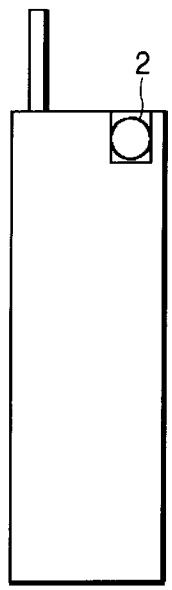
FIGS. 1A to 1C are views showing an external configuration of an imaging device according to an embodiment 1.
Figure 1B:
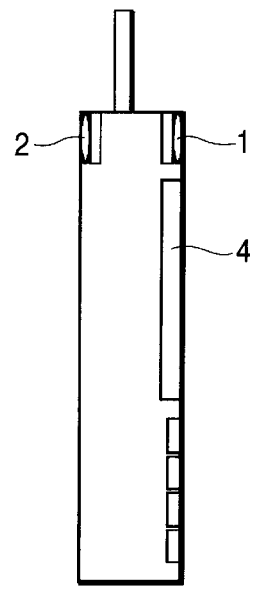
Figure 1C:
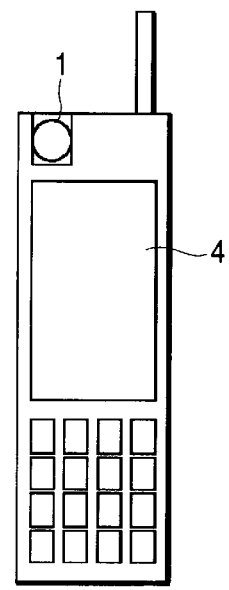

FIG. 1 is a front view, a rear view, and a side view showing an example of an outer shape of a mobile information terminal equipped with an imaging device according to an embodiment 1. Here, 1 is an own image side imaging portion for picking up the image of the cameraman (referred to as an "own image" hereinafter), and 2 is an opposite image side imaging portion for picking up the object, the scene, or the like that is positioned in front of the cameraman (referred to as an "opposite image" hereinafter). Also, 4 is a displaying portion on which the picked-up image is displayed. The own image side imaging portion 1 is provided on the same surface as the displaying portion 4.

Figure 2:
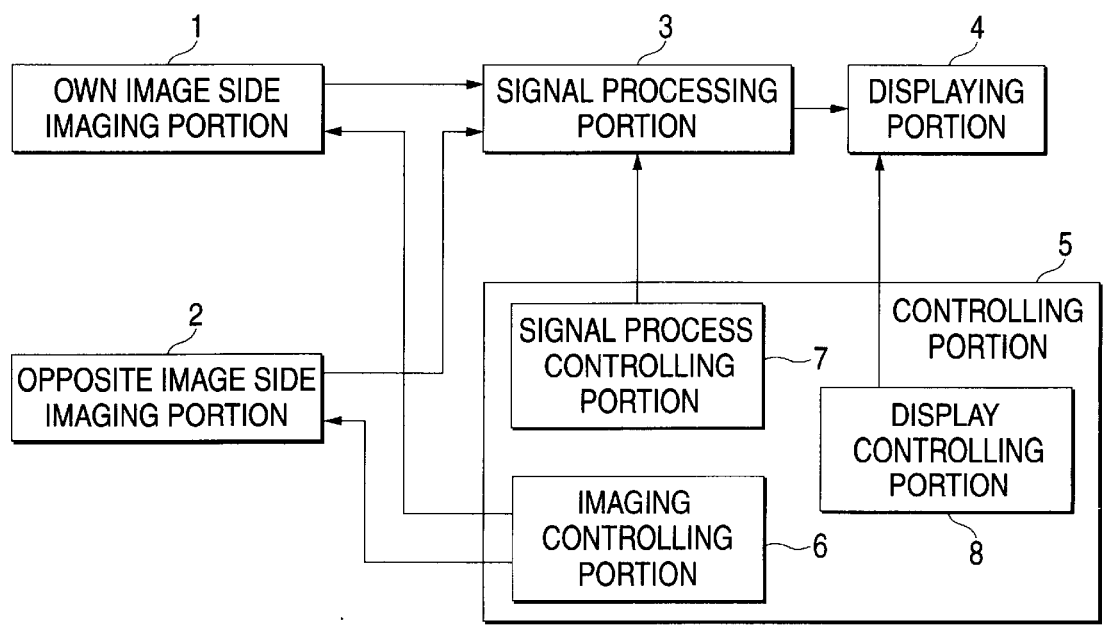
FIG. 2 is a view showing an internal configuration of the imaging device according to the embodiment 1.

FIG. 2 is a block diagram showing an internal configuration of the imaging device of the mobile information terminal shown in FIG. 1. The own image side imaging portion 1 and the opposite image side imaging portion 2 pick up the own image and the opposite image respectively and also execute the exposure correction, the white balance correction, the gamma correction, etc. at the time of the photographing. The images output from the own image side imaging portion 1 and the opposite image side imaging portion 2 are output to a signal processing portion 3. This signal processing portion 3 applies the expansion/contraction process, the effect process, etc. to the picked-up image, and then outputs the image to the displaying portion 4. This displaying portion 4 displays the image that is processed by the signal processing portion 3.

Above operations are controlled by a controlling portion 5. More particularly, an imaging controlling portion 6 outputs a control signal to cause the own image side imaging portion 1 and the opposite image side imaging portion 2 to execute the exposure correction, the white balance correction, the gamma correction, etc. Also, a signal process controlling portion 7 outputs a control signal to control a signal processing operation of the signal processing portion 3, and a display controlling portion 8 outputs a control signal to control a display operation of the displaying portion 4.

Figure 3:
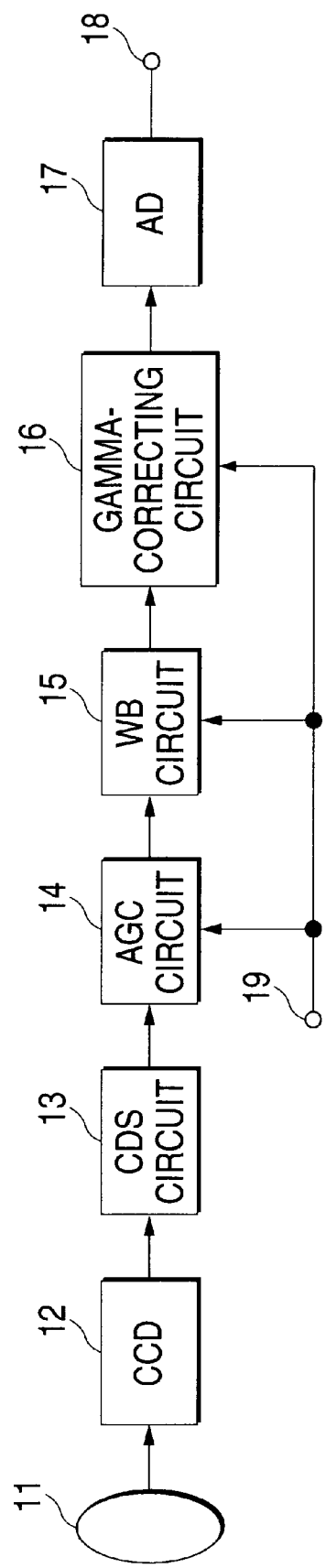
FIG. 3 is a view showing internal configurations of an own image side imaging portion and an opposite image side imaging portion.

Details of the own image side imaging portion 1 and the opposite image side imaging portion 2 will be explained hereunder. FIG. 3 is a view showing internal configurations of the own image side imaging portion 1 and the opposite image side imaging portion 2. Here, numeral 11 indicates an optical lens used to pick up the images of the own image and the opposite image. Optical images corresponding to the own image and the opposite image is input onto an imaging surface of a CCD 12 via the optical lens 11. The CCD 12 generates an image signal by converting the optical image formed on the imaging surface into an electric signal. In this case, the CCD 12 may be a CMOS sensor. Explanation including the case that the CCD 12 is the CMOS sensor will be made hereunder. A CDS circuit 13 applies the correlation dual sampling process to the image signal that is output from the CCD 12.

An AGC circuit 14 executes the gain adjustment of image signals (R, G, B signals, or Y, U, V signals, or Y, Cb, Cr signals) of the own image or the opposite image, and executes the exposure correction. A WB circuit 15 adjusts the white balance by applying the gain adjustment and the offset adjustment to the image signal of the own image or the opposite image. A gamma-correcting circuit 16 corrects a luminance signal of the own image or the opposite image. These operations are executed based on the control signal input from the imaging controlling portion 6 (shown in FIG. 2) via an input terminal 19. An A/D converter circuit 17 converts the image signal, which is subjected to the image process, into a digital image signal. The image signal converted into a digital form is output to the signal processing portion 3 via an output terminal 18.

As described above, the own image side imaging portion 1 mainly picks up the own image, and the opposite image side imaging portion 2 mainly picks up the opposite image such as the scene, etc., that is located in front of the cameraman. In this manner, since the quality of the image to be picked up is different in the own image side imaging portion 1 and the opposite image side imaging portion 2, the AGC circuit 14 and the gamma-correcting circuit 16 execute the exposure correction and the gamma correction that are suitable for each image.

Methods of the exposure correction and the gamma correction in the AGC circuit 14 and the gamma-correcting circuit 16 in the own image side imaging portion 1 and the opposite image side imaging portion 2 will be explained hereunder.

<Exposure Correction>

Figure 4:
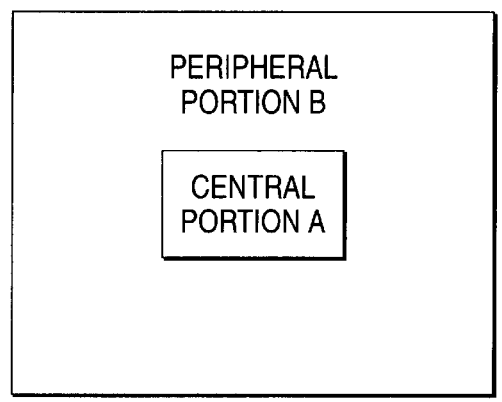
FIG. 4 is a descriptive view illustrating the exposure correction.

As shown in FIG. 4, the AGC circuit 14 in the own image side imaging portion 1 and the opposite image side imaging portion 2 divides the own image and the opposite image, that are picked up, into a central area of the image in which the major subject is picked up (referred to as a central portion A) and its peripheral area (referred to as a peripheral portion B), and then calculates a luminance component integrated value a, which is obtained by normalizing a luminance integrated value in the central portion A by its area, and a luminance component integrated value b, which is obtained by normalizing a luminance integrated value in the peripheral portion B. Again adjustment of the luminance signal is executed by multiplying the luminance component integrated value a by a predetermined weighting coefficient $\alpha$ ($\alpha$ is a positive real number) such that an addition value $\alpha \times a + b$ of this multiplied value and the luminance component integrated value b becomes equal to a target value $\beta$. That is, the optimum exposure can be obtained when $\alpha \times a + b = \beta$ is satisfied. Accordingly, the image of the subject in the central portion A can be picked up at the proper brightness. In this case, the weighting coefficient to the peripheral portion B is not limited to 1. The weighting coefficient to the central portion A is set to $\alpha 1$ and the weighting coefficient to the peripheral portion B is set to $\alpha 2$ such that $\alpha 1 > \alpha 2$ ($\alpha 1$, $\alpha 2$ are positive real numbers) may be satisfied.

In the above exposure correction, the weighting coefficient of the luminance component integrated value in the central portion A of the own image is set to $\alpha s$ and the weighting coefficient of the luminance component integrated value in the central portion A of the opposite image is set to $\alpha f$ such that $\alpha s > \alpha f$ (as a preferable example, $\alpha s : \alpha f = 7 : 4$) may be satisfied.

Figure 5A:
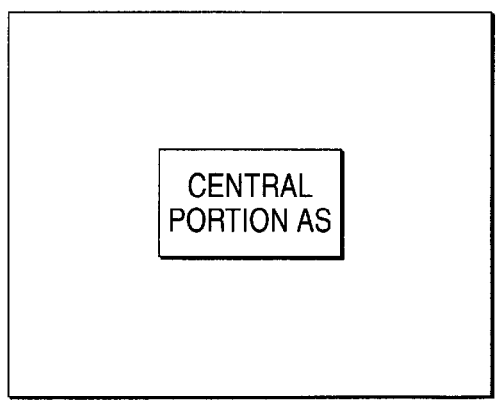
FIGS. 5A and 5B are descriptive views illustrating the exposure correction in the own image side imaging portion and the opposite image side imaging portion.
Figure 5B:
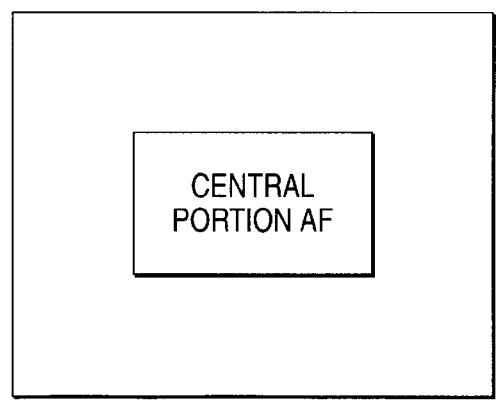

In addition/otherwise, a central portion AS shown in FIG. 5A is set to the own image and a central portion AF that is wider than the central portion AS and shown in FIG. 5B is set to the opposite image.

Since the image of the subject (cameraman) is picked up in the center of the screen in the own image side imaging portion 1, the proper exposure correction can be executed by increasing the weight of the subject in the central portion A of the image. As a preferable example, if an area of the central portion AS of the own image is set to ¼ of the overall image, the area in which the image of the subject is picked up can be set to the proper brightness.

In contrast, since the image of the scene, etc. that is positioned in front of the cameraman is mainly picked up in the opposite image side imaging portion 2, the imaging object of the opposite image is more distant than the own image and spreads into a wide range. Therefore, the exposure correction must be carried out such that the overall image have the proper brightness. As a result, in the opposite image, the weighting of the luminance component integrated value in the central portion of the image is set smaller than the own image and/or the weighted central portion AF is set into the wider range than the central portion AS of the own image.

In this manner, since the quality of the picked-up image is different in the own image side imaging portion 1 and the opposite image side imaging portion 2, the good images can be obtained by executing the optimum control in respective imaging portions. As shown in FIG. 5, in the case that the area of the central portion AF of the opposite image is set wider than the central portion AS of the own image, similar advantages can be achieved if the weighting coefficients $\alpha s$ and $\alpha f$ are set equally.

In this case, the screen dividing method in the automatic exposure correction is not limited to that shown in FIG. 5. If the screen is divided in a number of blocks and then the weighting coefficient of the luminance signal in the block that is positioned in the center of the own image is set larger than the opposite image, the similar advantages can be achieved.

Also, as a target value $\beta$ of the exposure correction, if a target value of the own image is set to $\beta s$ and a target value of the opposite image is set to $\beta f$, $\beta s > \beta f$ may be set. This is because, since the own image is often picked up in the backlight state, the subject can have the proper brightness by setting large the target value $\beta s$ of the own image.

<Gamma Correction>

Figure 6A:
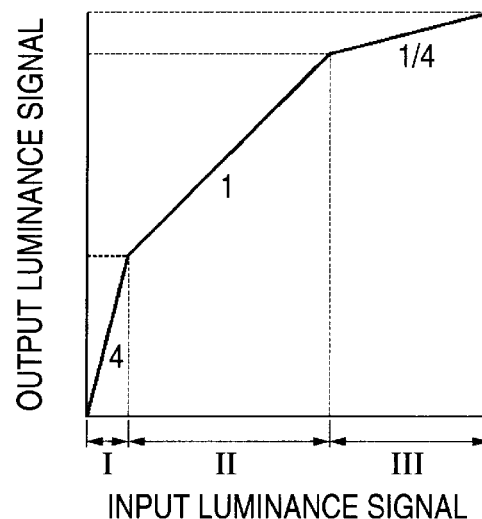
FIGS. 6A and 6B are descriptive views illustrating the gamma correction in the own image side imaging portion and the opposite image side imaging portion.

FIG. 6A is a view showing an example of the input/output characteristic of the gamma-correcting circuit 16 in the own image side imaging portion 1. An inclination in an area I is 4, an inclination in an area II is 1, and inclination in an area III is ¼. As shown in FIG. 6A, the gamma-correcting circuit 16 in the own image side imaging portion 1 emphasizes luminance difference in the low luminance area by assigning many tones to the low luminance component and reducing the tones assigned to the high luminance component.

Figure 6B:
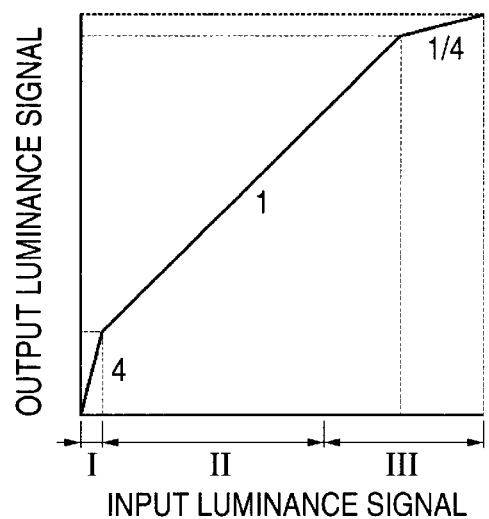

FIG. 6B is a view showing the input/output characteristic of the gamma-correcting circuit 16 in the opposite image side imaging portion 2. As shown in FIG. 6B, since the input/output characteristic of the gamma-correcting circuit 16 in the opposite image side imaging portion 2 has a narrow area I rather than the input/output characteristic in the own image side imaging portion 1 as shown in FIG. 6A, an emphasis extent of the luminance difference is small in the low luminance area.

Figure 7A:
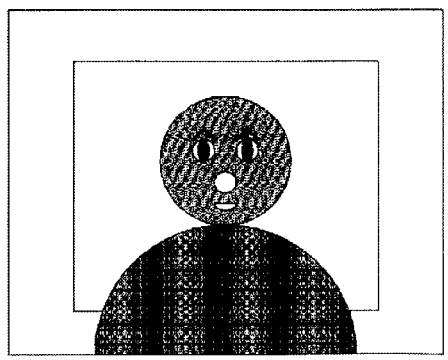
FIGS. 7A and 7B are descriptive views illustrating an action of the gamma correction in the own image side imaging portion.
Figure 7B:
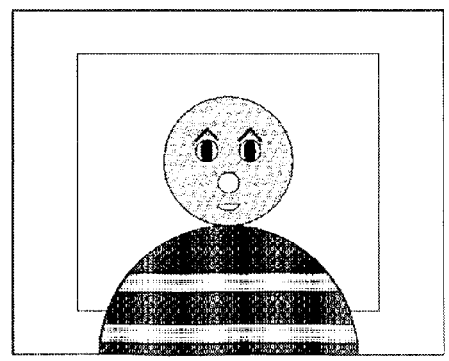

FIGS. 7A and 7B are descriptive views illustrating a tone converting action of the own image by the gamma-correcting circuit 16 shown in FIG. 6A. If the subject in the own image is positioned in the backlight state, the darkish image is generated, as shown in FIG. 7A. At this time, if the tone characteristic is converted by the gamma-correcting circuit 16 in the own image side imaging portion 1 so as to emphasize the luminance difference on the low luminance side as shown in FIG. 6A, the darkish image in the backlight state can be relaxed as shown in FIG. 7B. Since the opposite image is seldom positioned in the backlight state, the gamma correction is carried out based on the input/output characteristic, which is relatively close to the linear line, as shown in FIG. 6B.

In this case, the input/output characteristic of the gamma-correcting circuit 16 is not limited to that shown in FIG. 6. For example, inclinations in the area I, the area II, and the area III may be changed, otherwise the areas may be divided into narrower areas. Also, a conversion table by which any output level can set in response to each input level may be provided to provide any input/output characteristic.

As described above, the imaging device according to the embodiment 1 differentiates the imaging control in the imaging controlling portion 6 in the own image side imaging portion 1 that is used mainly to pick up the own image of the cameraman and the opposite image side imaging portion 2 that is used to pick up the scene in front of the cameraman. In other words, since the weighting to the luminance of the subject in the central portion of the image is enhanced in executing the exposure correction in the own image side imaging portion 1, the exposure correction that is optimum for the subject in the own image can be executed. In contrast, since the weighting is applied to the wider area than the own image in the opposite image side imaging portion 2, the exposure correction that is optimum for the opposite image in which the scene, etc. are picked up.

Also, since the tone conversion is executed in the gamma-correcting circuit 16 in the own image side imaging portion 1 to emphasize the luminance difference in the low luminance area, the own image that can also have the proper brightness in the backlight state can be obtained. In contrast, since the opposite image is hardly set in the backlight state in the opposite image side imaging portion 2, the proper brightness of the opposite image can be obtained by reducing the emphasis extent of the luminance difference in the low luminance area.

In this case, as shown in FIG. 8, the opposite image side imaging portion 2 may be provided to an upper surface portion of the mobile information terminal.

Next, details of the signal processing portion 3 shown in FIG. 2 will be explained hereunder. FIG. 9 is a view showing an internal configuration of the signal processing portion 3. The image signal output from the own image side imaging portion 1 is input into a synthesis selecting circuit 34 via an input terminal 31. The image signal output from the opposite image side imaging portion 2 is input into the synthesis selecting circuit 34 via an input terminal 32.

An expanding/contracting circuit 35 expands/contracts the image selected by the synthesis selecting circuit 34. In an effect circuit 36, special effect processes such that the image from the expanding/contracting circuit 35 is changed into a monochromatic color or a sepia color, or the negative/positive reversal is executed are carried out. The image signal that is subjected to the special effect process by the effect circuit 36 is output to the display portion 4 (shown in FIG. 2) via an output terminal 37. The above operations are carried out on the basis of the control signal that is input from the signal process controlling portion 7 (shown in FIG. 2) via an input terminal 33.

Figure 10:
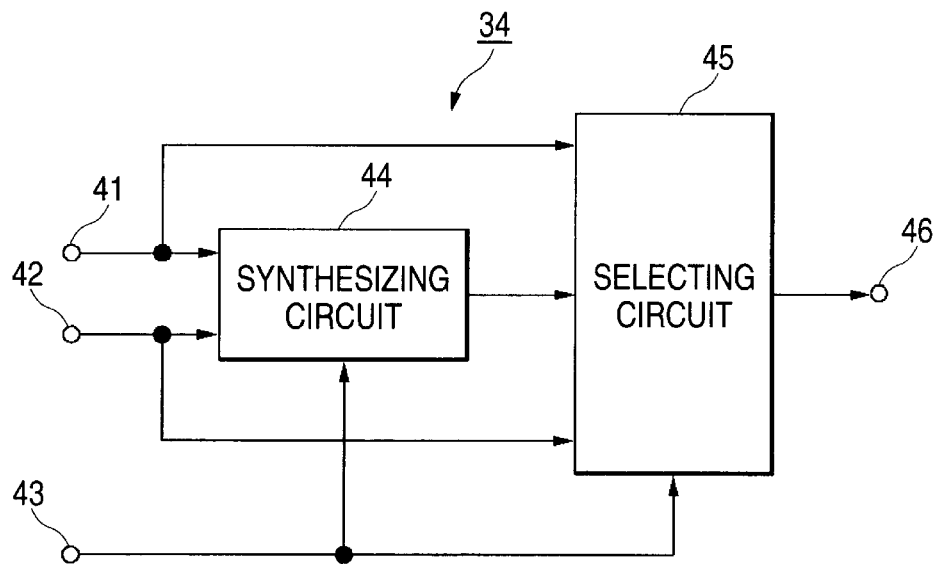
FIG. 10 is a view showing an internal configuration of a synthesis selecting circuit.

An internal configuration of the synthesis selecting circuit 34 in FIG. 9 is shown in FIG. 10. The image signals of the own image and the opposite side image are input into a synthesizing circuit 44 and a selecting circuit 45 via input terminals 41, 42 respectively. The synthesizing circuit 44 synthesizes a synthesized image in which the own image and the opposite image are synthesized (the detailed configuration of the synthesizing circuit 44 will be explained later). The synthesized image generated by the synthesizing circuit 44 is input into the selecting circuit 45. The selecting circuit 45 selects any one of the own image, the opposite image, and their synthesized image, and then outputs it to the expanding/contracting circuit 35. The above operations are carried out on the basis of the control signal input from the signal process controlling portion 7 (shown in FIG. 2) via an input terminal 43.

Next, an image synthesizing operation of the synthesizing circuit 44 in the synthesis selecting circuit 34 shown in FIG. 10 will be explained hereunder. The synthesizing circuit 44 generates the synthesized image of the own image being input from the own image side imaging portion 1 and the opposite image being input from the opposite image side imaging portion 2.

Figure 11:
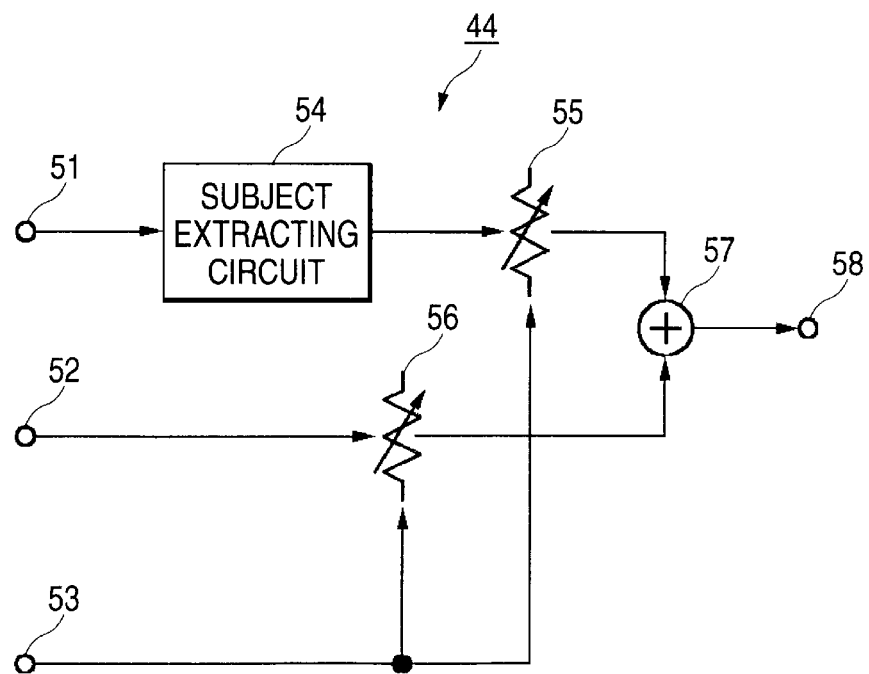
FIG. 11 is a view showing an internal configuration of a synthesizing circuit.
Figure 12A:
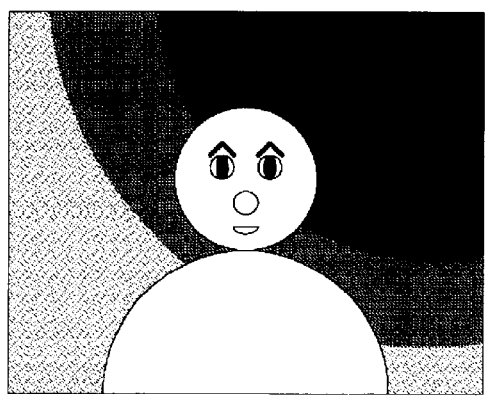
FIGS. 12A to 12D are descriptive views illustrating an operation of the synthesizing circuit.
Figure 12B:
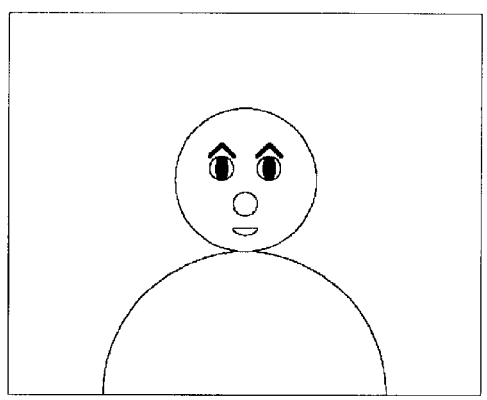

FIG. 11 is a view showing an internal configuration of the synthesizing circuit 44. FIGS. 12A, 12B, 12C and 12D are descriptive views illustrating an image synthesizing operation of the synthesizing circuit 44. The own image picked up by the own image side imaging portion 1 and shown in FIG. 12A is input into a subject extracting circuit 54 via an input terminal 51. The subject extracting circuit 54 extracts only the subject from the own image, as shown in FIG. 12B. As the subject extracting method, as set forth in the Unexamined Japanese Patent Application Publication No. Sho59-208983, for example, there are the method of extracting the subject by discriminating the subject based on a difference in sampling data of the image, the method of extracting the subject based on the pattern matching by preparing previously expected patterns of the subject, the method of extracting the subject by detecting the skin color of the human being to calculate the peripheral portion based on the skin color portion, etc.

Figure 12C:
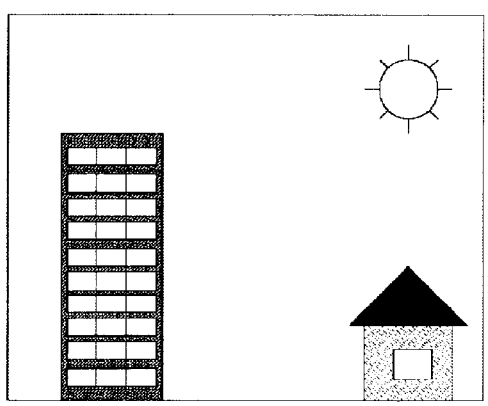

The image of the subject extracted by the subject extracting circuit 54 is input into a fader circuit 55. In contrast, the opposite image picked up by the opposite image side imaging portion 2 and shown in FIG. 12C is input into a fader circuit 56 via an input terminal 52. The fader circuit 55 and the fader circuit 56 change the luminance of the image in compliance with the control signal input from the signal process controlling portion 7 via the input terminal 53. An adding circuit 57 adds outputs of the fader circuit 55 and the fader circuit 56 to generates the synthesized image shown in FIG. 12D.

Figure 12D:
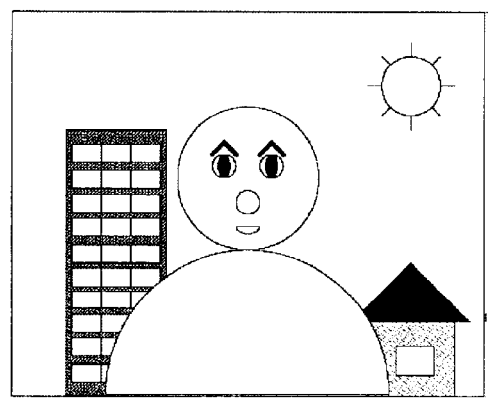

Here, assume that the attenuation rate of the fader circuit 55 is set to r1 ($0<r1\leq1$) and the attenuation rate of the fader circuit 56 is set to r2 ($0<r2\leq1$), and that the attenuation rates r1=1 and r1=0 are set in the subject area and the background area of the subject respectively in the subject extracted image (shown in FIG. 12B) that is output from the subject extracting circuit 54. Also, the control is carried out in the opposite image such that the attenuation rate r2=0 is set in the area in which the subject is synthesized and the attenuation rate r2=1 is set in the area that serves as the background of the subject in synthesizing the image. In this way, the synthesized image shown in FIG. 12D is generated by controlling the attenuation rates r1, r2 of the fader circuits 55, 56 to executed the synthesis.

Also, if the attenuation rate r1 of the fader circuit 55 is set to the output of the subject extracting circuit 54 in the range of $0<r1<1$, the attenuation rate r2 of the fader circuit 56 in the area in which the subject extracted from the own image is synthesized is set in the range of $0<r2<1$, and r1+r2=1 is satisfied, the subject may be semi-transparently displayed.

Also, if the attenuation rate r1 of the fader circuit 55 and the attenuation rate r2 of the fader circuit 56 are changed with the lapse of time, the fade-in and the fade-out of the subject can be executed.

In the embodiment 1, there are supposed the case where only the own image side imaging portion 1 is operated, the case where only the opposite image side imaging portion 2 is operated, and the case where both imaging portions are operated simultaneously. In this case, such switching of the operations of respective imaging portions can be attained by providing a switching member to the main body of the mobile information terminal.

(Embodiment 2)

FIG. 13 is a front view, a rear view and a side view showing an external configuration of an imaging device according to an embodiment 2. An imaging portion 100 is rotatably supported to the main body of the imaging device in which the displaying portion 4 is arranged, and has a rotation mechanism that can rotate along the flat surface direction of the displaying portion 4 by 180°. Thus, the cameraman can pick up the own image and the opposite image by using a single imaging portion.

FIG. 14 is a view showing an internal configuration of the imaging device in the mobile information terminal shown in FIG. 13. An imaging direction detecting portion 9 detects the imaging direction of the imaging portion 100, and then outputs the detected result to the imaging controlling portion 6. The internal configuration of the imaging device 100 is similar to internal configurations of the own image side imaging portion 1 and the opposite image side imaging portion 2 in the embodiment 1 shown in FIG. 2. The imaging controlling portion 6 controls operations of the exposure correction and the gamma correction in the AGC circuit 14 and the gamma-correcting circuit 16 in the imaging device 100 based on the imaging direction of the imaging device 100 detected by the imaging direction detecting portion 9.

Since other configurations and their operations are similar to those in the embodiment 1, their explanation will be omitted.

Figure 15:
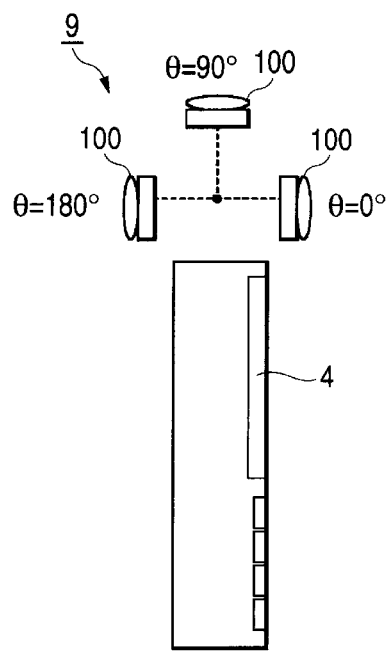
FIG. 15 is a descriptive view illustrating an operation of an imaging portion.

As shown in FIG. 15, the imaging direction detecting portion 9 detects a rotation angle Θ of the imaging device 100 on the basis of the imaging direction in picking up the own image, and then outputs the detected result to the imaging device 100. In the case of 0°≦Θ<90°, the imaging device 100 executes the exposure correction and the gamma correction like the own image side imaging portion 1 described in the embodiment 1. In the case of 90°≦Θ<180°, the imaging device 100 executes the exposure correction and the gamma correction like the opposite image side imaging portion 2. In this case, the switching between the exposure correction and the gamma correction is not requested at the rotation angle Θ=90°, and such switching may be changed appropriately. For example, a plurality of rotation angles may be set, and then the imaging control maybe switched at a plurality of such rotation angles. Also, a rotation range of the imaging device 100 is not limited to 180°.

In this manner, if the imaging portion 100 that can be rotated into the imaging directions of the own image and the opposite image is provided, the own image and the opposite image can be picked up by using a single imaging member. Also, if the exposure correction and the gamma correction of the picked image are executed based on the rotation angle of the imaging device 100, such exposure correction and such gamma correction can be applied properly to the own image and the opposite image.

In this case, a mute area between the own image and the opposite image may be provided not to display the disturbance of the image generated in switching the imaging direction.

The rotation mechanism of the imaging device 100 shown in the embodiment 2 may be applied to the embodiment 1. That is, the own image side imaging portion 1 and the opposite image side imaging portion 2 may be constructed by the imaging portion that is supported rotatably to the main body of the mobile information terminal.

(Embodiment 3)

Figure 16:
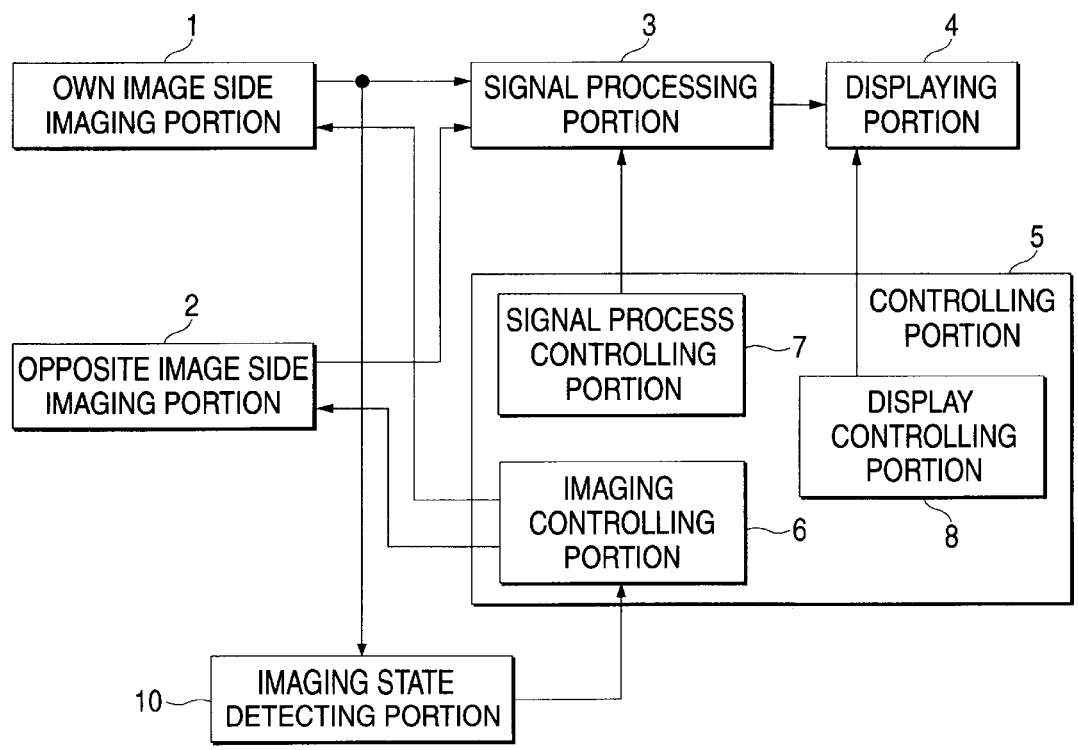
FIG. 16 is a view showing an internal configuration of an imaging device according to an embodiment 3.

FIG. 16 is a block diagram showing an internal configuration of the mobile information terminal having an imaging device according to an embodiment 3. Here, 10 is an imaging state detecting portion that detects the imaging state of the own image picked up by the own image side imaging portion 1. This imaging state detecting portion 10 detects that the subject is positioned in either the backlight state or the front-light state based on the luminance signal of the own image. The imaging state of the own image can be detected by dividing the image into a plurality of blocks and comparing integrated values of the luminance signals in respective blocks.

The imaging state detecting portion 10 outputs the signal indicating the imaging state to the imaging controlling portion 6. Then, the imaging controlling portion 6 controls the operation of the gamma correction in the own image side imaging portion 1. That is, if it is decided that the subject in the own image is positioned in the backlight state, the gamma correction for highlighting the luminance difference in the low luminance area is executed by the gamma-correcting circuit 16 in the own image side imaging portion 1, as shown in FIG. 6A. In contrast, if the subject in the own image is positioned in the front-light state, the gamma correction in which the emphasis extent of the luminance difference in the low luminance area is set small is executed, as shown in FIG. 6B.

Since other operations are similar to those in the embodiment 1, their explanation will be omitted.

In this fashion, if the imaging state of the own image is detected by the imaging state detecting portion 10 and then the gamma correction for highlighting the luminance difference in the low luminance area is executed when the subject of the own image is in the backlight state, the proper backlight correction is applied and the good own image can be obtained.

In this case, in the embodiment 3, the imaging state detecting portion 10 may detect not only the front-light/backlight states but also the spot light state in which the light area is present locally in the dark background, and then the optimum exposure correction may be applied to such area if the spot light state is detected.

(Embodiment 4)

Figure 17:
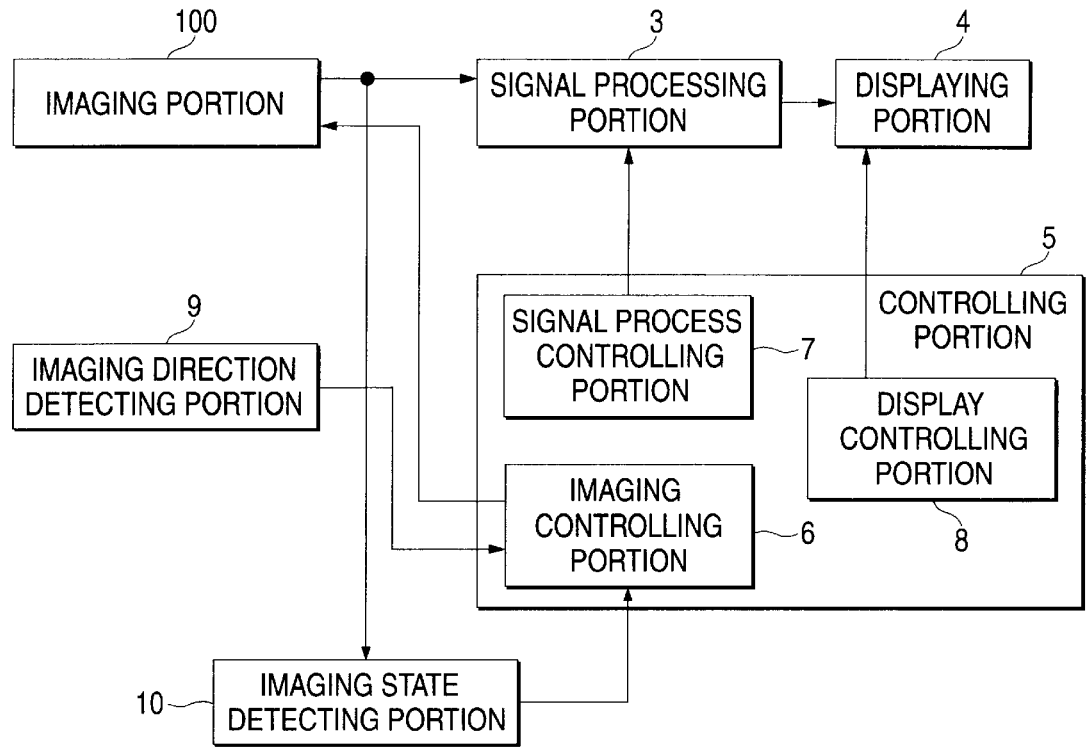
FIG. 17 is a view showing an internal configuration of an imaging device according to an embodiment 4.

FIG. 17 is a block diagram showing an internal configuration of the mobile information terminal using an imaging device according to an embodiment 4. As shown in FIG. 13, the imaging portion 100 has the mechanism that can be rotated into the imaging directions of the own image and the opposite image. The imaging direction detecting portion 9 detects the imaging direction of the imaging portion 100 and then outputs the detected result to the imaging controlling portion 6, like the embodiment 2. The imaging state detecting portion 10 detects the imaging state of the imaging portion 100 from the picked-up image output from the imaging portion 100, and then output a signal indicating the detected result to the imaging controlling portion 6. In the imaging controlling portion 6, the exposure correction and the gamma correction in the imaging portion 100 are controlled based on the imaging direction result of the imaging portion 100 output from the imaging direction detecting portion 9 and the imaging state of the imaging portion 100 output from the imaging state detecting portion 10. Since other operations are similar to those in the embodiment 1, their explanation will be omitted.

In the embodiment 4, in case the rotation angle Θ is 0°≦Θ<90°, the imaging portion 100 executes the exposure correction similar to that in the own image side imaging portion 1 described in the embodiment 1. At this time, the imaging portion 100 executes the gamma correction based on the characteristic shown in FIG. 6A if it is decided by the imaging state detecting portion 10 that the subject is positioned in the backlight state, and executes the gamma correction based on the characteristic shown in FIG. 6B if it is decided that the subject is positioned in the front-light state.

In contrast, in case the rotation angle Θ of the imaging portion 100 is 90°<Θ<180°, the imaging portion 100 executes the exposure correction similar to that in the opposite image side imaging portion 2 described in the embodiment 1.

In this manner, since the imaging portion 100 that can rotate in the imaging directions of the own image and the opposite image is provided, the own image and the opposite image can be picked up by using a single imaging member. Also, if the exposure correction and the gamma correction of the picked-up image are executed based on the rotation angle of the imaging portion 100, the proper exposure correction and the proper gamma correction can be applied to the own image and the opposite image.

As described in the embodiment 2, the switching of the exposure correction and the gamma correction is not needed at the rotation angle $\Theta=90°$, and may be changed appropriately. For example, a plurality of rotation angles may be set and then the imaging control may be switched at a plurality of such rotation angles. Also, the rotating range of the imaging portion 100 is not limited to 180°.

Also, if the imaging state of the own image is detected by the imaging state detecting portion 10 and then the subject of the own image is positioned in the backlight state, the proper backlight correction can be carried out by executing the gamma correction that emphasizes much more the luminance difference in the low luminance area, so that the good own image can be obtained.

(Embodiment 5)

Figure 18A:
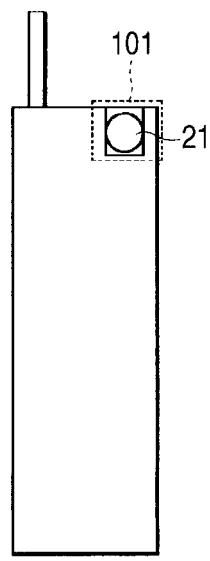
FIGS. 18A to 18C are views showing an external configuration of an imaging device according to an embodiment 5.
Figure 18B:
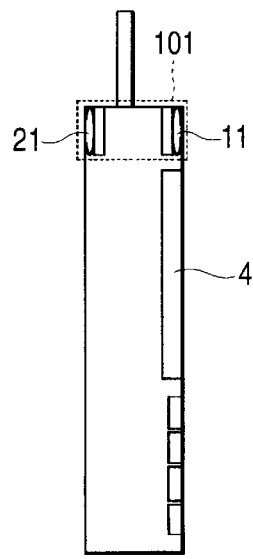
Figure 18C:
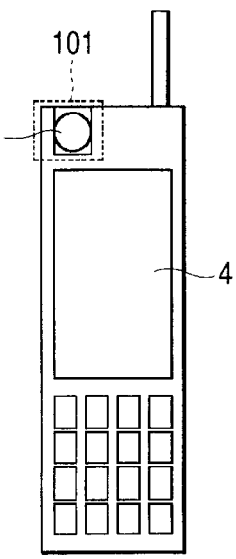

FIG. 18 are views showing an external configuration of a mobile information terminal using an imaging device according to an embodiment 5. In FIG. 18, 101 is an imaging portion that picks up the own image and the opposite image via lenses 11, 21.

Figure 19A:
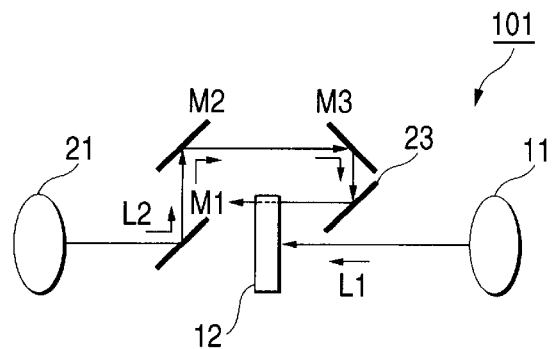
FIGS. 19A and 19B are views showing a detailed configuration of an imaging portion.
Figure 19B:
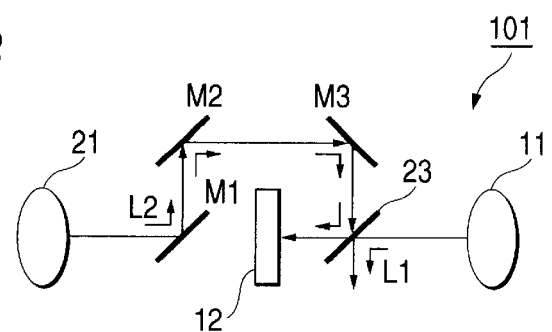

FIGS. 19A and 19B are views showing a detailed configuration of the imaging portion 101 as shown in FIG. 18. Here, 23 is a selector switch that switches a luminous flux L1 input via the lens 11 and a luminous flux L2 input via the lens 21 to supply to an imaging surface of the CCD 12. The selector switch is composed of a mirror that reflects the luminous flux from a mirror M3 to the imaging surface of the CCD 12. The luminous flux L1 input via the lens 11 and the luminous flux L2 input via the lens 21 can be switched by sliding the selector switch 23 to form the image onto the imaging surface of the CCD 12. That is, the selector switch 23 for switching the luminous flux L1 input from the lens 11 and the luminous flux L2 input from the lens 21 consists of the mirror and its sliding mechanism. In this case, the method of switching the luminous flux into two ways is not limited to the above. The switching may be executed by omitting the mirror M3 and then rotating the CCD 12 such that the luminous flux from the mirror M2 or the luminous flux from the lens 21 can be directly input into the imaging surface of the CCD 12.

If the own image is to be picked up, the luminous flux L1 from the lens 11 can be input into the imaging surface of the CCD 12 by moving the selector switch 23 upwardly, as shown in FIG. 19A. Also, if the opposite image is to be picked up, the luminous flux L1 input from the lens 11 is shut off by moving the selector switch 23 downwardly, as shown in FIG. 19B, and then the luminous flux L2 reaching via the mirrors M1 to M3 is input into the imaging surface of the CCD 12. The optical image on the imaging surface of the CCD 12 is converted into the image signal and then output to the subsequent stage. In this case, the configuration on the later stage of the CCD 12 is similar to that shown in FIG. 3. The direction along which the selector switch 23 is moved in switching the imaging direction may be set to the direction that is opposite to that shown in FIGS. 19A and 19B. That is, the selector switch 23 is moved downwardly to input the luminous flux L1 into the imaging surface of the CCD 12, while the selector switch 23 is moved upwardly to shut off the luminous flux L1 and to cause the luminous flux L2 to reflect onto the imaging surface of the CCD 12.

Figure 20:
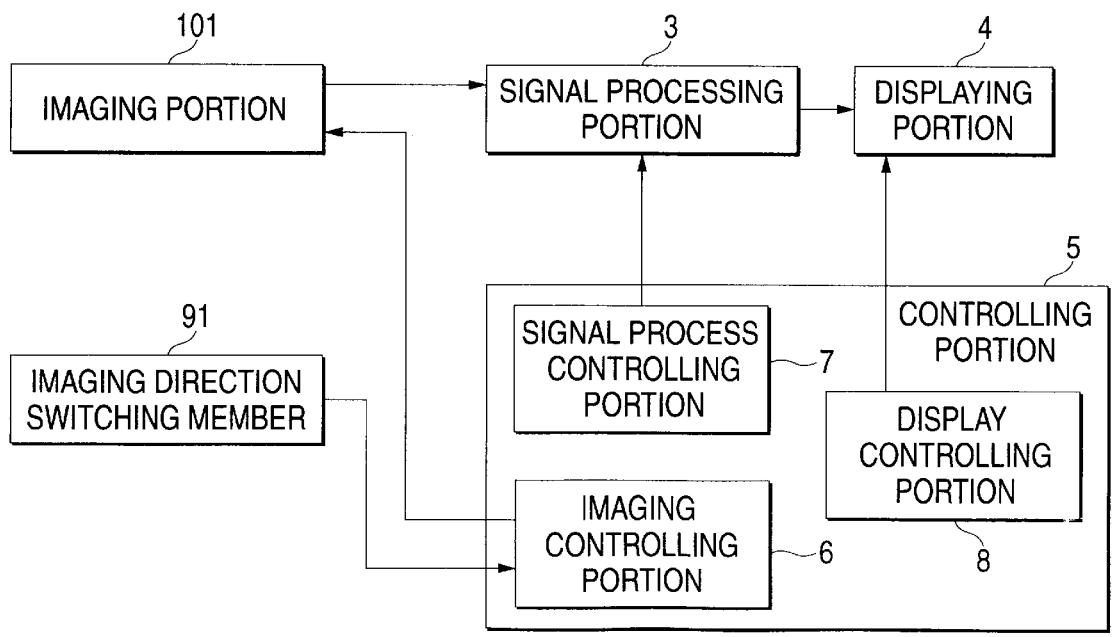
FIG. 20 is a view showing an internal configuration of the imaging device according to the embodiment 5.

FIG. 20 is a view showing an internal configuration of the imaging device in the mobile information terminal shown in FIG. 18. An imaging direction switching member 91 outputs a switching signal, which switches the own image and the opposite image to pick up them selectively, to an imaging portion 101. This imaging portion 101 drives the selector switch 23 based on this switching signal to switch the luminous fluxes from the lens 11 or the lens 21, as shown in FIGS. 19A and 19B, and to input it into the imaging surface of the CCD 12.

The switching signal output from the imaging direction switching member 91 is also output to the imaging controlling portion 6. The imaging controlling portion 6 outputs the control signal, that is generated based on this switching signal, to the imaging portion 101. Accordingly, the exposure correction and the gamma correction of the own image side imaging portion 1, as described in the embodiment 1, are executed if the imaging direction is the own image direction, whereas the exposure correction and the gamma correction of the opposite image side imaging portion 2 are executed if the imaging direction is the opposite image direction.

FIG. 21 are views showing another external configuration of the mobile information terminal having the imaging device according to the embodiment 5. In the imaging portion 102 shown in FIG. 21, the lens 21 for picking up the opposite image is provided to the top portion of the mobile information terminal. FIGS. 22A and 22B are views showing a detailed configuration of the imaging portion shown in FIG. 21. In case the own image is to be picked up, the selector switch 23 shuts off the luminous flux L2 from the lens 21, as shown in FIG. 22A, and causes the luminous flux L1 from the lens 11 to input into the imaging surface of the CCD 12. Also, in case the opposite image is to be picked up, the selector switch 23 shuts off the luminous flux L1 from the lens 11, as shown in FIG. 22B, and causes the luminous flux L2 from the lens 21 to input into the imaging surface of the CCD 12.

Figure 23A:
FIGS. 23A and 23B are schematic views showing an example of an imaging direction switching member.
Figure 23B:
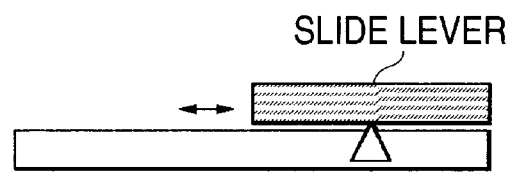

FIGS. 23A and 23B are sectional views showing an outline of the imaging direction switching member 91. A slide lever shown in FIGS. 23A and 23B is provided to the mobile information terminal having the imaging device shown in FIG. 21, and the own image and the opposite image may be switched by sliding this slide lever. In other words, if a pushing switch having an electric contact represented by a triangle in FIGS. 23A and 23B is not pushed down as shown in FIG. 23A, the own image is picked up as shown in FIG. 19A or FIG. 22A. In contrast, if the pushing switch is pushed down as shown in FIG. 23B, the opposite image is picked up as shown in FIG. 19B or FIG. 22B.

In this case, optical paths for inputting the own image and the opposite image into the imaging surface of the CCD 12 are not limited to the above.

Figure 24:
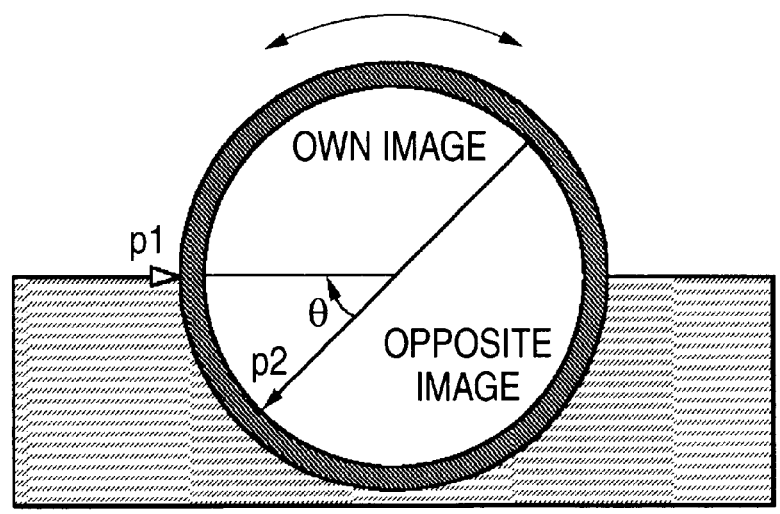
FIG. 24 is schematic views showing another example of an imaging direction switching member.

The imaging direction switching member 91 for switching the own image and the opposite image is not limited to the above. As shown in FIG. 24, the imaging direction switching member 91 may be composed of a circular cylindrical member that can be rotated in the direction indicated by an arrow. The switching between the own image and the opposite image is executed based on the rotation angle from the reference position (the rotation position at which arrows p1, p2 coincide with each other) of the circular cylindrical member, as shown in FIG. 24. That is, as an example, the selector switch 23 (shown in FIGS. 19 and 22) is driven to pick up the own image if the rotation angle $\theta$ is $0° \leq \theta < 180°$, and the selector switch 23 is driven to pick up the opposite image if the rotation angle $\theta$ is $180° \leq \theta < 360°$. In this case, in order to prevent the appearance of the disturbance of the image in switching, the mute period may be provided in switching the own image and the opposite image.

The imaging device according to the embodiment 5 can be applied to the embodiment 3 that is equipped with the imaging state detecting portion 10.

The above embodiments 1 to 5 are concerned with the imaging device in the mobile information terminal having the imaging device. But the above embodiments may be applied to PDA (Personal Data Assistant) having the imaging device such as CCD, etc., or the digital still camera having the display screen such as the liquid crystal panel, etc.

The imaging device according to the present invention adjusts the luminance in the first image such that the addition value of the value, which is obtained by multiplying the feature quantity of the luminance in the central portion of the first image by the first coefficient, and the feature quantity of the luminance in the peripheral portion of the first image becomes the first target value, and also adjusts the luminance in the second image such that the addition value of the value, which is obtained by multiplying the feature quantity of the luminance in the central portion of the second image by the second coefficient that is set independently of the first coefficient, and the feature quantity of the luminance in the peripheral portion of the second image becomes the second target value. Therefore, the subject having the proper brightness can be obtained in both the first image and the second image.

What is claimed is:

1. An imaging device comprising:

a member for picking up a first image and a second image;

a member for calculating a feature quantity of a luminance in a central portion and a peripheral portion of the first image, and adjusting the luminance in the first image such that an addition value of a value that is obtained by multiplying the feature quantity of the luminance in the central portion of the first image by a first coefficient and the feature quantity of the luminance in the peripheral portion of the first image becomes a first target value; and a member for calculating the feature quantity of the luminance in the central portion and the peripheral portion of the second image, and adjusting the luminance in the second image such that an addition value of a value that is obtained by multiplying the feature quantity of the luminance in the central portion of the second image by a second coefficient, which is set independently of the first coefficient, and the feature quantity of the luminance in the peripheral portion of the second image becomes a second target value.

2. The imaging device according to claim 1, wherein the second coefficient is set larger than the first coefficient.

3. The imaging device according to claim 1, wherein the second target value is set larger than the first target value.

4. The imaging device according to claim 1, wherein an area of the central portion of the first image is set larger than an area of the central portion of the second image.

5. The imaging device according to claim 1, wherein weighting rates of luminance component integrated values in respective central portions of the first image and the second image are set to about 4:7.

6. The imaging device according to claim 1, wherein an area of the central portion in the second image is set to about ¼ of an overall area of the second image.

7. The imaging device according to claim 1, further comprising:

a member for converting a tone of the luminance in the second image.

8. The imaging device according to claim 7, wherein an imaging state of the second image is detected, and the tone assigned to a low luminance component that is lower than a predetermined value is increased, if the second image is positioned in a backlight state.

9. The imaging device according to claim 1, further comprising:

a member for synthesizing the first image and the second image.

10. The imaging device according to claim 1, wherein the first image and the second image are picked up by an imaging member that is rotatably supported to a main body.

11. The imaging device according to claim 1, further comprising:

a first lens member for forming an image corresponding to the first image;

a second lens member for forming an image corresponding to the second image; and a member for selecting one of images formed by said first lens member and said second lens member, and forming a selected image onto an imaging surface of an imaging member.

12. The imaging device according to claim 1, wherein said member for picking up a first image and a second image is CCD.

13. The imaging device according to claim 12, wherein said member for picking up a first image and a second image is CMOS.

* * * * *